Oct. 1, 1968 TAKEO SHINOHARA ET AL 3,404,240

REPERTORY DIAL IMPULSE SYSTEM USING A MAGNETIC MEMORY

Filed June 22, 1965 2 Sheets-Sheet 1

INVENTORS.
TAKEO SHINOHARA
KEISAKU NOMURA

Hopgood & Calimafde
ATTORNEYS.

Oct. 1, 1968 TAKEO SHINOHARA ET AL 3,404,240

REPERTORY DIAL IMPULSE SYSTEM USING A MAGNETIC MEMORY

Filed June 22, 1965 2 Sheets-Sheet 2

INVENTORS.
TAKEO SHINOHARA
KEISAKU NOMURA

Hopgood & Calimafde
ATTORNEYS.

United States Patent Office 3,404,240
Patented Oct. 1, 1968

3,404,240
REPERTORY DIAL IMPULSE SYSTEM USING A MAGNETIC MEMORY

Takeo Shinohara and Keisaku Nomura, Tokyo, Japan, assignors to Nippon Electric Company Limited, Minatoku, Tokyo, Japan, a corporation of Japan

Filed June 22, 1965, Ser. No. 465,980
Claims priority, application Japan, June 26, 1964, 39/36,197
7 Claims. (Cl. 179—90)

ABSTRACT OF THE DISCLOSURE

A repertory abstract dialer producing pulses according to a programmable magnetic memory which consists of ferrite cores in a matrix configuration. The memory is programmed by threading a wire, which would effectively represent a stored number, through the cores so as to obtain the desired number and sequence of digits as determined by the number and respective cores threaded.

This invention relates to the automatic transmission of digits between remote points and has particular application to the automatic dialing of subscriber telephones.

Conventional digit transmission and automatic dialing systems generally require unnecessarily long time intervals between digit transmission, and in the event of misoperation until the digit is reinitiated. These systems also tend to be expensive and consume components when stored numbers are replaced. Automatic dialing systems tend to add insertion loss, exhibit sporadic time intervals between digits, depending upon the preceding digits' valve, and do not include easily adjustable line busy timing, dial tone reception timing and pulse and pulse interval timing.

Accordingly, it is the object of this invention to provide an automatic digit transmission apparatus, particularly adaptable to telephones which overcomes the recited defects in conventional systems, in an economic, stable and easily maintained apparatus.

The above mentioned and other features and objects of this invention and the manner of attaining them will become more apparent and the invention itself will best be understood by reference to the following description of an embodiment of the invention taken in conjunction with the accompanying drawings wherein.

Figure 1:
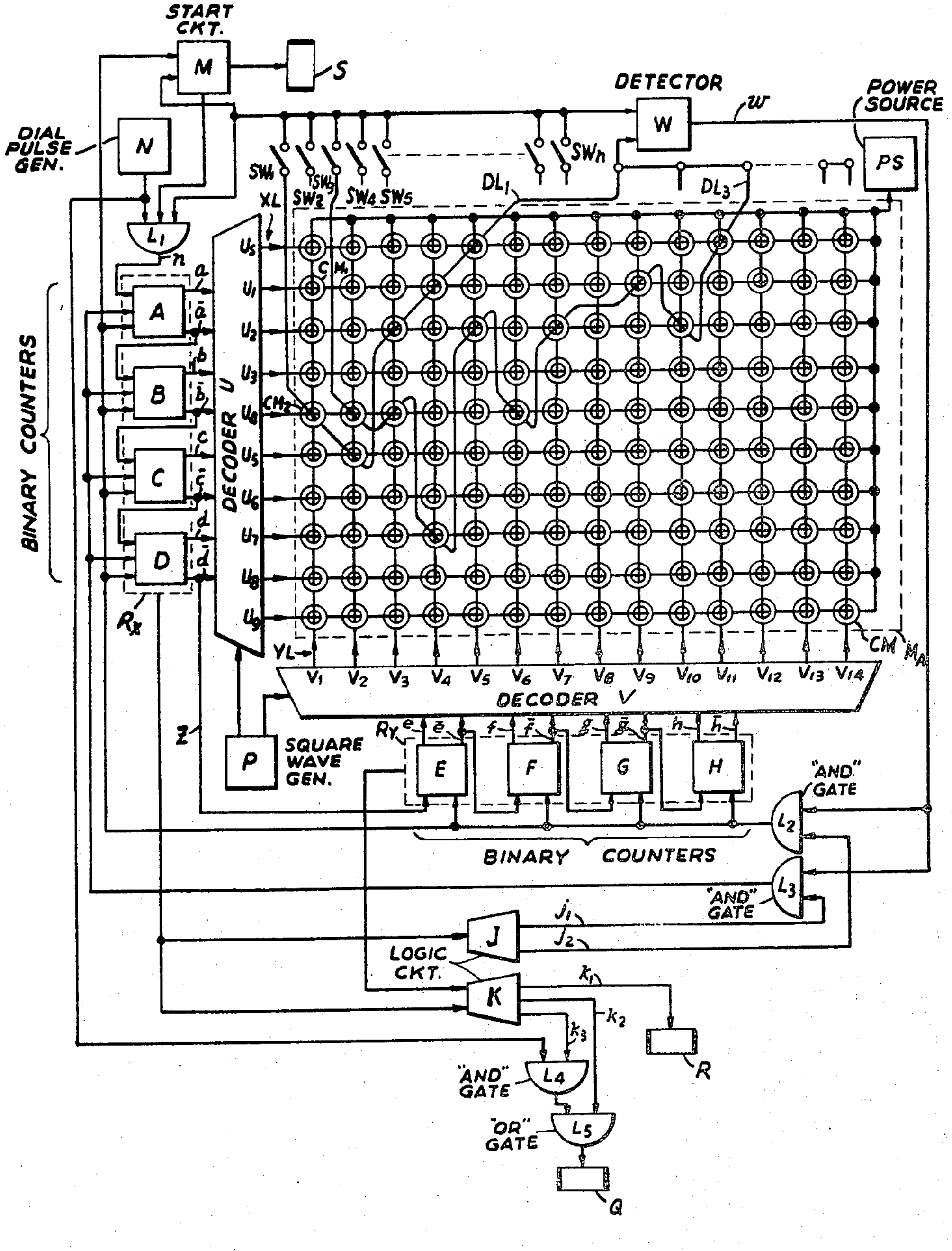
FIG. 1 is a schematic illustration of an embodiment of the invention for use with telephone equipment.

Turning now to FIG. 1, the arrangement according to the invention may be seen to be predicated upon a storage matrix MA consisting of, for example, a plurality of rectangular hysteresis ferrite cores CM arranged in an X, Y coordinate array. Core interrogation is obtained by the conjunctive energization of $X_L$ and $Y_L$ wires: the output being exhibited upon a DL wire threading predetermined cores. Each of the DL wires, by virtue of its path in threading the cores, defines a stored number. Thus, for example, $DL_1$ stores the number 4521 (to be used for illustration hereinafter). The digit 0 is stored by the absence of a threaded core, for reasons which will become apparent and consequently $DL_3$ would define the number 0447242012. This latter number could, in the United States, be employed for ten digit area code dialing.

Array interrogation sequencing is provided by the X and Y coordinate decoders U and V which are driven by the respective registers $R_x$ and $R_y$ consisting of counters A–D and E–H. These decoders translate the binary number in the counters to drive the $X_L$ and $Y_L$ wires (which thread cores assigned to digit value and position, respectively) sequentially with a square wave from generator P in conjunction with the power source PS.

Before entering upon an operative example, which will be employed to explain the invention in detail, the function of several other components will be briefly set forth.

Figure 3:
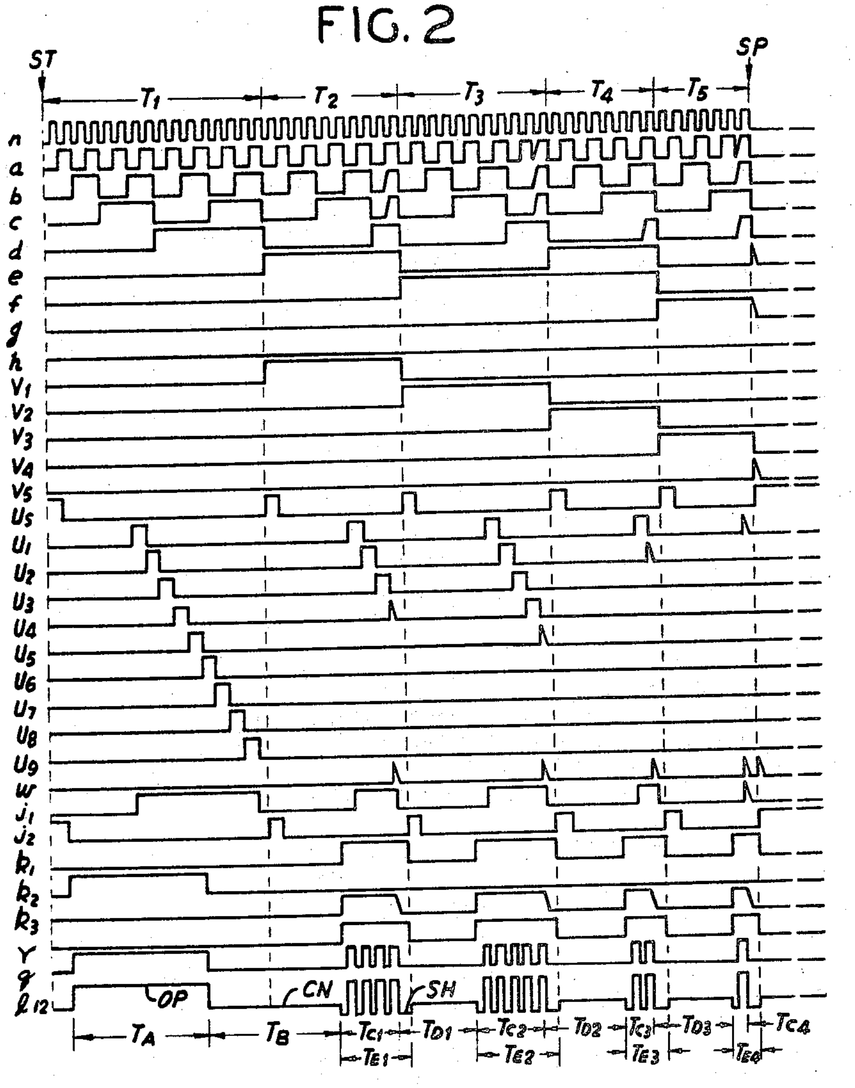
FIG. 3 illustrates the pulse timing throughout the circuitry of FIG. 1 for the operative example described.

Circuits J and K are decoder or logic circuits which exhibit the outputs shown in FIG. 3 upon the occurrence of predetermined binary counter conditions. That is, logic circuit J exhibits a continuous output on lead $j_1$ when the register $R_x$ contains a count corresponding to $U_1$–$U_9$; and an output on $j_2$ when the count corresponds to $U_s$. Circuit K, which is dependent upon both registers, exhibits an output on the lead $k_2$ when register $R_x$ is sequencing to a predetermined state *and* register $R_y$ is in its reset state; and on leads $k_1$ and $k_3$ when register $R_x$ is sequencing through predetermined states *and* register $R_y$ is *not* in its reset state. Since logic circuits which perform such or analgous functions are replete in the art, they will not be described further herein.

The detector W detects an output on the memory wires $DL_1$, $DL_2$ etc. and, depending upon the status of logic circuit J, jumps either the Register $R_x$ or both registers to their final or reset state, via the respective AND gates $L_2$ and $L_3$.

Figure 2:
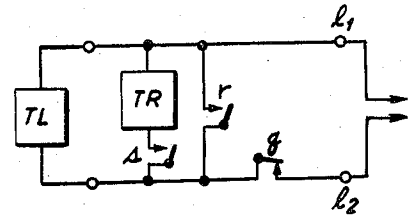
FIG. 2 shows the cooperation of the invention with a telephone subset.

In FIG. 2, *q*, *r* and *s* are contacts controlled by the associated relay denoted by corresponding capital letters in FIG. 1. TR is an auxiliary receiver, TL the local subset, and $l_1$ and $l_2$ are the telephone wire pair going to the central office switching equipment.

Assume now the telephone subscriber wishes to dial a stored number and for illustrative purposes the number chosen is 4521 (a four digit number is chosen for brevity in explanation), which is represented by the wire $DL_1$. Selection and circuit initiation is accomplished by closing the selector switch (which could be an interlocked push button) $SW_1$. This triggers the starting circuit M which energizes the relay S, applies an input to AND circuit $L_1$ and simultaneously resets all of the binary counters A–H. $L_1$ may now transmit the pulses *n* (FIG. 3) from the pulse generator N, which it does, advancing the $R_x$ step by step for each pulse (100 milliseconds).

During the first period $T_1$, FIG. 3 (the starting time is denoted as ST), the Y axis decoder does not select a coordinate wire ($V_1$ is not energized). During the portion TA of $T_1$, the relay Q is driven by the logic circuit K, via lead $k_2$ and OR circuit $L_5$. This period (approximately 1 second), in which *s* is closed and *q* is open (FIG. 2) is for busying the line. The next period $T_B$ when the Q relay has released ($k_2$ is off) leaves the circuit of FIG. 2 with the receiver TR in series with line for dial tone recognition.

After register $R_x$ has sequenced to the end register $R_y$ is triggered to its initial state over lead Z and period $T_2$ begins. $R_x$ again begins sequencing under the influence of the pulse generator N. At time $U_s$ nothing happens because the output from $j_2$ is blocked by AND gate $L_2$. The time from $U_s$ to $U_1$ is employed to extend the period $T_B$ for dial tone recognition and provide a uniform timing between digits. This timing may easily be accomplished, for example, by allowing the first several states of the binary counter to be without effect on the matrix (there being $2^4$ or 16 states). Hence $U_1$ need not be energized until a binary count corresponding to 7, there being sufficient remaining states to trigger $U_1$–$U_9$ with one left over (for the digit 0).

When register $R_x$ in the second period ($T_2$) triggers, via decoder U, the $Y_2$ lead attached to terminal $U_1$, there is no output to detector W since $DL_3$ does not thread the core $CM_1$ even though $V_1$ is also energized (register $R_y$ now being in its initial state as mentioned). This output from Register $R_x$ (equivalent to $U_1$) does, however, appear at logic circuit K. Since now register $R_y$ is *not* reset and $R_x$ is sequencing in the period $U_1$ et seq., there will be an output (shown in FIG. 3) upon leads $k_1$ and $k_3$. Accordingly, relay R will be energized and relay Q will be energized via AND gate $L_4$ and OR gate $L_5$ upon the occurrence of a pulse from generator N. Thus, in FIG. 2 $r$ will close and $q$ will open exhibiting to the line $l_1$–$l_2$ the first dial pulse. Each subsequent output in the second period will likewise open contact $q$ until $U_4$ of the axis decoder U is selected. That is, during this period, after the beginning of the time shown at $T_{c1}$ in FIG. 3, the contact $r$ of relay R is kept closed and the relay Q is driven by the signal of the dial pulse generator N through the AND gate $L_4$, and the OR gate $L_5$; the contact $q$ repeatedly closing 33 milliseconds and opening 67 milliseconds.

When core $CM_2$ is selected by $U_4$ and $V_1$ an output voltage appears on memory wire DL, and is detected by detector W which in turn energizes one lead of both of the AND gates $L_2$ and $L_3$. Since only $j_1$ is actuated at this time (reference may be made to the condition of excitation of the J logic circuit, supra) only AND gate $L_3$ has an output. This output is applied to each of the counters A–D of register $R_x$ to jump this register immediately to its final state.

Subsequently, the X axis register $R_x$ advances one step under the influence of the dial pulse generator N and the Y axis register $R_y$ also advances a step (by the output on lead Z) and enters the third period ($T_3$ in FIG. 3). During the third period relays Q and R respond as before and this time five pulses are sent out over the telephone lines.

This will continue until the end of the fifth period $T_5$. When the sixth period (not shown) is reached, detector W receives an output during time $U_s$ and now AND gate $L_2$ responds and both registers jump to their reset state (recall that reset is accomplished upon the initial energization of the circuit); simultaneously, the starting circuit M is driven so that the system returns to the state at which it awaits the next selection (except for relay S, as will be explained). At this juncture, it should be pointed out that $j_1$ is not energized, the counters not being in a state corresponding to $U_1$–$U_9$, and hence AND gate $L_3$ remains dormant.

The wave form $l_{12}$ in FIG. 3, shows the impedance change with time between terminals $l_1$ and $l_2$ of FIG. 2. The upper level (OP in FIG. 3) of this wave form shows the open circuit condition, the lower level (SH in FIG. 3) shows the circuit closed, and the middle level (CN in FIG. 3) shows that the telephone TL or the receiver TR is connected in the state of line busy. Therefore, the time $T_B$ in FIG. 3 (for example, 1 sec.) is the time when dial tone is recognized, the time $T_{C1}$ (for example, 0.4 sec.) is the time when the dial impulse of first digit is sent out, the time $T_{D1}$ (for example, 0.6 sec.) is the interval between the dial impulses of the first and second digits, the time $T_{E1}$ (for example, 0.5 sec.) is the time when the receiver TR or the telephone TL is short circuited during sending out the dial impulse of first digit (the dial impulse is planned not to be transmitted to the receiver TR or the telephone TL).

The subscriber has now been called. Because relay S is still operational, the $s$ contact (FIG. 2) is closed and the operator of the apparatus can hear the ring back tone; the receiver TR being connected across the line $l_1$–$l_2$. When the other end picks up the local handset of TL is removed for speaking and the relay is released (not shown). This may easily be accomplished by, for example, contacts disposed in the local subset in series with the relay.

Thereafter, the system need have no relation to the telephone circuit except for the normally closed contact $q$.

If found undesirable, the relay S, its contact $s$ and the receiver TR may be removed. These components are merely included for the local observation of the line busy tone in the interval between pulses and the ring back tone. These functions may instead be performed by the local subset TL, with the handset being removed at the outset (rather than after ringing the called subscriber).

From the foregoing, it may be seen that when used as an automatic dialer, the invention provides the following advantages:

(1) The time between the final dial pulse of each digit and the initial dial impulse of the next digit is always 633 msecs. (assuming $U_1$ triggers on the seventh pulse), which is the accumulated time interval between pulses $U_s$ and $U_1$ and a dial closing time of 33 msecs. This timing can be selected smaller or greater and therefore the transmission sequence can be as quick as the switching equipment will allow.

(2) By suitably interconnecting the logic circuits J and K, the X and Y axis decoders and the $R_x$ and $R_y$ register stages, the line busy time after start, and the dial tone listening time can be set as desired.

(3) When the called line is busy, it is only necessary to restart the system, no special operation is required. Further, when a switch is misselected and the system is operating, it is only necessary to reselect the correct switch.

(4) By comprising the X register of 4 binary counters for telephone use, a suitable time schedule can be planned in constructing the operational program for the line busy open time, the dial tone listening time, the dial impulse sending time, and the pause between pulses.

(5) All timing relations are dependent upon a single dial pulse generator.

(6) When the system is used as an automatic dialing system and an auxiliary loudspeaking receiver is used, it is unnecessary to pick up the receiver of the local telephone unless the called line is free.

(7) The number of digits can easily be selected by increasing or decreasing the binary counters in the Y axis register, the input and output terminals of the Y axis decoder which correspond to the counter circuits in the Y axis resistor, and the number of memory cores.

(8) When the system is used in a telephone circuit, the insertion loss of the system is just that introduced by the included contact ($q$) and is thus very small.

The application of the system according to this invention is not limited to the automatic dialing of a telephone, but can be expanded to peripheral equipments of transmission systems by using more sophisticated elements (e.g. transistors) and speeding up pulse intervals.

While we have described above the principles of our invention in connection with specific apparatus, it is to be clearly understood that this description is made only by way of example and not as a limitation to the scope of our invention as set forth in the objects thereof and in the accompanying claims.

We claim:

1. An automatic digit transmission apparatus comprising:

a plurality of coordinately triggerable storage devices arranged in an $x$, $y$ coordinate array;

a plurality of $x$, $y$ driving wires each electrically associated with all the storage devices of common coordinate value;

a plurality of memory wires each associated with predetermined of said devices and each defining by its path in said array a stored series of digits, each digit save the highest in the employed numeric base being represented by its $x$ coordinate position;

detecting means coupled in common to said memory wires;

selection means for coupling a predetermined one of said memory wires in circuit with said detecting means;

driving means respectively coupled to the $x$ and $y$ driving wires;

means coupled to said $x$ coordinate driving means for the sequential triggering thereof;

means coupled to said $y$ coordinate driving means for the triggering thereof, said means being responsive to the complete sequencing of said $x$ coordinate triggering means for the stepping thereof to the next coordinate value;

pulse output means coupled to the $x$ coordinate sequential triggering means and responsive thereto;

and means responsive to an output from said detecting means for jumping said $x$ coordinate sequential triggering means to its final state.

2. The automatic digit transmission apparatus claimed in claim 1 further comprising: an auxiliary $x$ coordinate wire disposed sequentially first in said array, each of said memory wires being last associated with a storage device electrically associated with said auxiliary wire; and logic means responsive to an output from said detecting means *and* the first position of said $x$ coordinate sequence triggering means for jumping both said $x$ and $y$ triggering means to their reset state.

3. The automatic digit transmission apparatus claimed in claim 2 further comprising means for introducing a predetermined time lag between the triggering of said auxiliary $x$ coordinate wire and the next sequential $x$ coordinate wire.

4. The automatic digit transmission apparatus claimed in claim 3 in which said $x$ coordinate sequential triggering means comprises a pulse generator driven binary counter of at least four stages and in which the driving means associated with said triggering means comprises a decoder, one of the first few counting steps of said counter being assigned by the associated decoder to said auxiliary $x$ coordinate wire, a plurality of the last steps of said counter being assigned by said decoder on a one-to-one basis to the digit-representing $x$ coordinate wires, whereby the intermediate steps of said counter introduce a predetermined time lag between one digit and the next.

5. The automatic digit transmission apparatus as claimed in claim 1 in combination with a telephone subset and wire pair in which said pulse output means comprises an electric switch in circuit with said wire pair and with said subset.

6. The combination claimed in claim 5 further comprising a second electric switch in shunt with said wire pair, and logic means responsive to predetermined conditions of said binary counter and said $y$ coordinate triggering means for energizing said second switch.

7. The combination claimed in claim 6 wherein said first and second electric switches are relays and said storage devices are ferrite cores.

References Cited

UNITED STATES PATENTS 3,291,917 12/1966 Takahashi ---------- 179—90

KATHLEEN H. CLAFFY, *Primary Examiner.*

A. H. GESS, *Assistant Examiner.*